US008439552B2

(12) United States Patent  (10) Patent No.: US 8,439,552 B2
Jeong et al.  (45) Date of Patent: May 14, 2013

(54) BACKLIGHT UNIT OF DISPLAY APPARATUS

(75) Inventors: Kyung-ock Jeong, Suwon-si (KR);
Il-yong Jung, Yongin-si (KR);
Myung-ryul Jung, Suwon-si (KR);
Dae-hee Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 167 days.

(21) Appl. No.: 12/784,958

(22) Filed: May 21, 2010

(65) Prior Publication Data

US 2010/0296310 A1  Nov. 25, 2010

(30) Foreign Application Priority Data

May 25, 2009  (KR) .................. 10-2009-0045364
May 13, 2010  (KR) .................. 10-2010-0044999

(51) Int. Cl.
*F21V 7/04* (2006.01)
*G02F 1/1333* (2006.01)

(52) U.S. Cl.
USPC .............................. 362/634; 362/632; 349/58

(58) Field of Classification Search .................. 362/634, 362/632; 349/58
See application file for complete search history.

(56) References Cited

U.S. PATENT DOCUMENTS

| | | | | |
|---|---|---|---|---|
| 5,497,293 A * | 3/1996 | Noguchi et al. | ............... | 362/609 |
| 7,125,157 B2 * | 10/2006 | Fu et al. | .................. | 362/632 |
| 7,184,110 B2 * | 2/2007 | Kim et al. | ................... | 349/58 |
| 7,333,163 B2 * | 2/2008 | Huang et al. | .................. | 349/58 |
| 7,367,708 B2 * | 5/2008 | Hsieh | .......................... | 362/634 |
| 7,380,972 B2 * | 6/2008 | Shimizu | ........................ | 362/632 |
| 7,490,973 B2 * | 2/2009 | Fujikawa et al. | ............. | 362/634 |
| 7,771,108 B2 * | 8/2010 | Iwasaki | ........................ | 362/634 |
| 7,883,252 B2 * | 2/2011 | Matsui et al. | ................. | 362/612 |
| 8,297,823 B2 * | 10/2012 | Cho et al. | ...................... | 362/606 |
| 2003/0223020 A1 * | 12/2003 | Lee | ................. | 349/58 |
| 2006/0203519 A1 * | 9/2006 | Shin et al. | .................... | 362/632 |
| 2006/0262570 A1 | 11/2006 | Kang | | |
| 2007/0091645 A1 * | 4/2007 | Chang et al. | ................. | 362/632 |
| 2008/0303979 A1 * | 12/2008 | Shimizu | ........................ | 349/65 |
| 2009/0027585 A1 | 1/2009 | Cho | | |
| 2009/0097277 A1 | 4/2009 | Iwasaki | | |

OTHER PUBLICATIONS

Communication dated May 7, 2012 issued by the European Patent Office in counterpart European Patent Application No. 10163383.2.

* cited by examiner

*Primary Examiner* — David J Makiya
(74) *Attorney, Agent, or Firm* — Sughrue Mion, PLLC

(57) ABSTRACT

A backlight unit of a display apparatus is provided. The backlight unit includes a display housing, a light source which is arranged along an inner circumference the display housing, a light guide plate through which light of the light source is transmitted, and which forms surface light, an optical sheet which is disposed on an upper side of the light guide plate to upwardly diffuse the light of the light source transmitted through the light guide plate, a plurality of first fixing units, each of which fix both the light guide plate and the optical sheet, a plurality of second fixing units which support only the light guide plate, and a support frame which is connected to the display housing to fix the optical sheet to the display housing provisionally, and has a window formed on a surface corresponding to the light guide plate to allow light to pass therethrough.

19 Claims, 6 Drawing Sheets

BACKLIGHT UNIT OF DISPLAY APPARATUS

CROSS-REFERENCE TO RELATED APPLICATIONS

This application claims priority from Korean Patent Application No. 10-2009-0045364, filed on May 25, 2009, and No. 10-2010-0044999, filed on May 13, 2010, in the Korean Intellectual Property Office, the disclosure of which is incorporated herein by reference in its entirety.

BACKGROUND

1. Field

Apparatuses consistent with the inventive concept relate to a display apparatus, and more particularly, to a structure that fixes a light guide plate (LGP) and an optical sheet in a backlight unit (BLU) of a display apparatus.

2. Description of the Related Art

Display apparatuses employing thin-film transistor liquid crystal display (TFT-LCD) panels require backlight units (BLUs) to display images. Generally, cold cathode fluorescent lamps (CCFLs) are widely used as light sources of BLUs. However, recently, CCFLs are being replaced with light emitting diodes (LEDs) as a result of restriction on use of mercury and an increase in demand for slimmer display apparatuses.

BLUs may be edge-type BLUs or direct-lighting type BLUs according to the location of LEDs used as light sources of BLUs. In the case of an edge-type BLU, a light source is disposed around a light guide plate (LGP) corresponding to a frame of the BLU, and an optical sheet is disposed on a rear surface of the LGP in order to uniformly diffuse light of the light source passing through the LGP to equalize brightness of the LGP.

The LGP is fixed and separated from the light source by a predetermined distance to prevent the LGP which is made of resin materials from being thermally deformed by heat generated by lighting the LED. In order to fix the LGP, the LGP includes a plurality of fixing projections such as studs which are disposed at regular intervals on a housing of a display apparatus, and a plurality of support grooves into which the plurality of fixing projections are inserted. Accordingly, the LGP may be fixed by connection of the fixing projections and the support grooves. The fixing projections are sufficiently thick to support the weight of the LGP. Additionally, the support grooves are disposed to correspond to the fixing projections or at appropriate intervals, based on an amount of the LGP to be constricted, expanded or dropped down.

Additionally, the optical sheet needs to be attached to the LGP. The optical sheet has a predetermined pattern formed thereon to enable the light of the LED transmitted through the LGP to be appropriately diffused, so that a constant brightness of the LGP may be maintained. However, if the optical sheet is moved, a light leakage phenomenon may occur, so there is a need to accurately fix the optical sheet in an appropriate position. Accordingly, the optical sheet requires a plurality of openings, so as to be hung on a sheet hanger connected to the housing of the display apparatus.

Considering characteristics of edge-type BLUs, the fixing projections and sheet hanger need to be disposed proximate the light source. However, in this situation, grooves need to be formed on a portion of the LGP which faces the fixing projections and sheet hanger, so that the fixing projections and sheet hanger may pass through the grooves. Accordingly, it is impossible to avoid loss of light in the portion where the grooves are formed. Therefore, there is a need to carefully take into consideration the mounting location, the size and the number of fixing projections and sheet hanger.

SUMMARY

Exemplary embodiments may overcome the above disadvantages and other disadvantages not described above. Also, an exemplary embodiment is not required to overcome the disadvantages described above, and an exemplary embodiment of the present invention may not overcome any of the problems described above.

One or more exemplary embodiments provide a BLU of a display apparatus which has an improved structure to reduce the number of working processes and manufacturing cost of component parts and to minimize loss of light of the BLU.

According to an aspect of one or more exemplary embodiments, there is provided a BLU of a display apparatus, the BLU including a display housing, a light source which is arranged along an inner circumference the display housing, a light guide plate through which light of the light source is transmitted, and which forms surface light, an optical sheet which is disposed on an upper side of the light guide plate to upwardly diffuse the light of the light source transmitted through the light guide plate, a plurality of first fixing units, each of which fix both the light guide plate and the optical sheet, a plurality of second fixing units which support only the light guide plate, and a support frame which is connected to the display housing to fix the optical sheet to the display housing provisionally, and has a window formed on a surface corresponding to the light guide plate to allow light to pass therethrough, wherein the light source, the light guide plate, the first fixing units, and the second fixing units are disposed between the display housing and the support frame.

Each of the plurality of first fixing units may include a first fixing projection which is connected to a housing of the display apparatus, a first support groove which is disposed in a position corresponding to the first fixing projection, and an optical sheet opening which is disposed in a position of the optical sheet corresponding to the first support groove and through which the first fixing projection penetrates.

The plurality of first fixing units may be disposed symmetrically on an upper side and a lower side of the LGP.

Each of the plurality of second fixing units may include a second fixing projection which is connected to the housing of the display apparatus, and a second support groove which is disposed in a position corresponding to the second fixing projection.

The plurality of second fixing units may support the upper side, the lower side, a left side and a right side of the LGP. Additionally, the plurality of second fixing units may be disposed symmetrically at one position between the plurality of first fixing units on the upper side of the LGP and the opposite position between the plurality of first fixing units on the lower side of the LGP, and disposed symmetrically at two positions on the left side of the LGP and two positions on the right side of the LGP.

The first fixing projection and the second fixing projection may be configured with the same component part.

The first fixing projection may include a first portion which supports the optical sheet, and a second portion which supports the LGP. In this situation, the first portion and the second portion may have different diameters.

As described above, according to the exemplary embodiments, the LGP and the optical sheet are supported at the same position, and thus it is possible to minimize loss of light in a position where the fixing units are mounted. Additionally, it is possible to reduce the number of times the support grooves of the LGP are cut and the number of times the optical sheet openings are punched through the optical sheet, thereby reducing the cost required to manufacture component parts.

Furthermore, component parts for supporting the LGP and the optical sheet may be used in common, and it is thus possible to reduce the cost of component parts.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
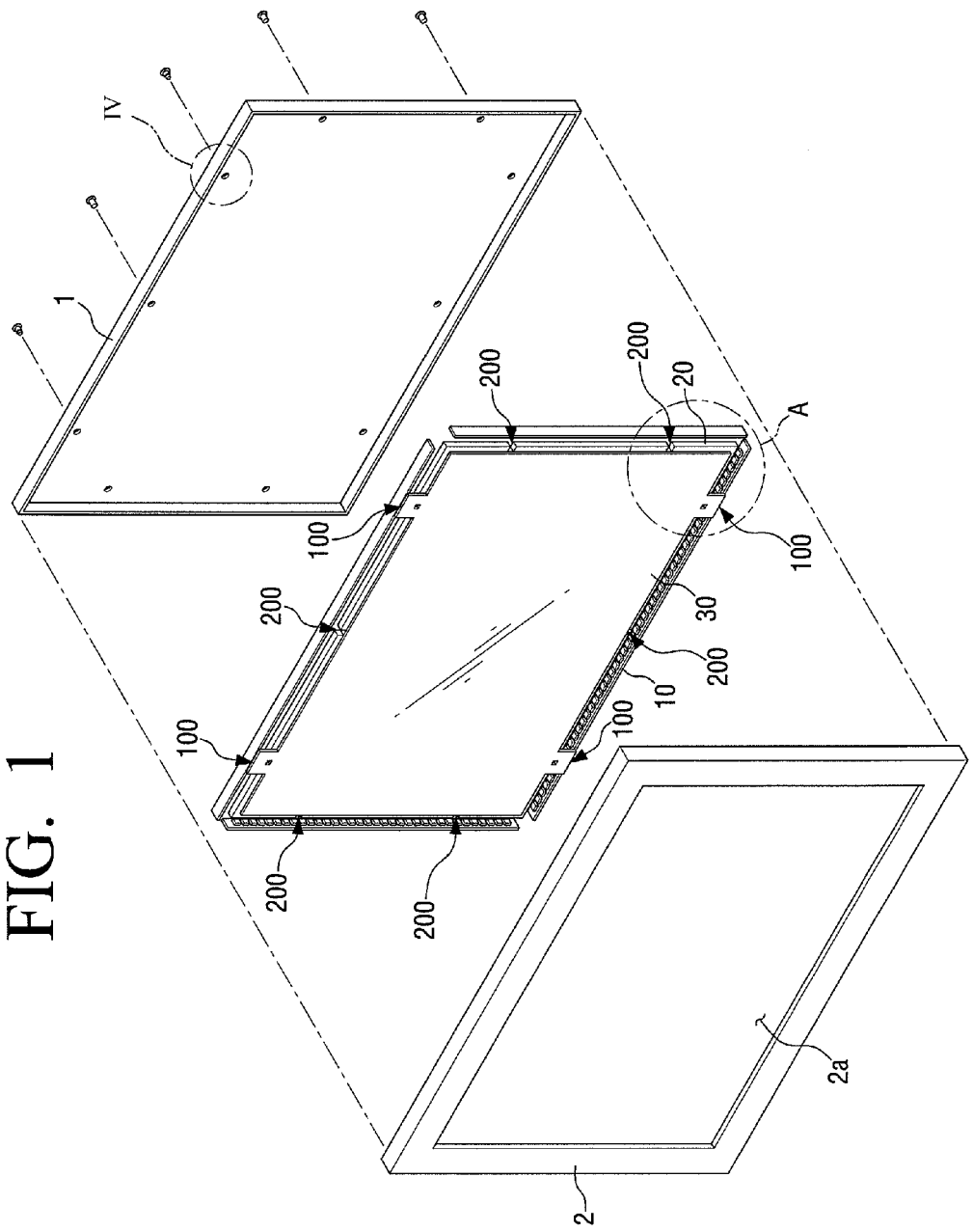
FIG. 1 is a perspective view of a backlight unit (BLU) of a display apparatus according to an exemplary embodiment.

Certain exemplary embodiments will now be described in greater detail with reference to the accompanying drawings.

In the following description, the same drawing reference numerals are used for the same elements even in different drawings. The matters defined in the description, such as detailed construction and elements, are provided to assist in a comprehensive understanding of the invention. Thus, it is apparent that the exemplary embodiments can be carried out without those specifically defined matters. Also, well-known functions or constructions are not described in detail since they would obscure the invention with unnecessary detail.

FIG. 1 schematically illustrates a BLU of a display apparatus according to an exemplary embodiment of the present invention.

As shown in FIG. 1, the BLU includes a display housing 1, a support plate 2, a light source 10, a light guide plate (LGP) 20, an optical sheet 30, a first fixing unit 100 and a second fixing unit 200.

The display housing 1 accommodates a control board and a plurality of electronic components to drive the BLU. The support plate 2 is connected to an upper side of the display housing 1.

The light source 10, the LGP 20, the optical sheet 30 and the first and the second fixing units 100 and 200, which configure the BLU, are disposed in a space formed between the support plate 2 and the display housing 1.

The display housing 1 and the support plate 2 are connected to each other such that the light source 10, the LGP 20, the optical sheet 30, and the first and the second fixing units 100 and 200 are prevented from being detached and are fixed in their respective positions.

The light source 10 includes a plurality of light emitting diodes (LEDs), which are disposed at regular intervals on an edge portion of the LGP 20 on a printed circuit board (PCB).

The LGP 20 is made of transparent materials so that light generated by the light source 10 may be transmitted therethrough. The LGP 20 is spaced apart by a predetermined distance from the light source 10.

The optical sheet 30 is attached to the LGP 20, and diffuses the light, which is generated by the light source 10 and is transmitted through the LGP 20, and enables brightness of the LGP 20 to be equalized.

Figure 5:
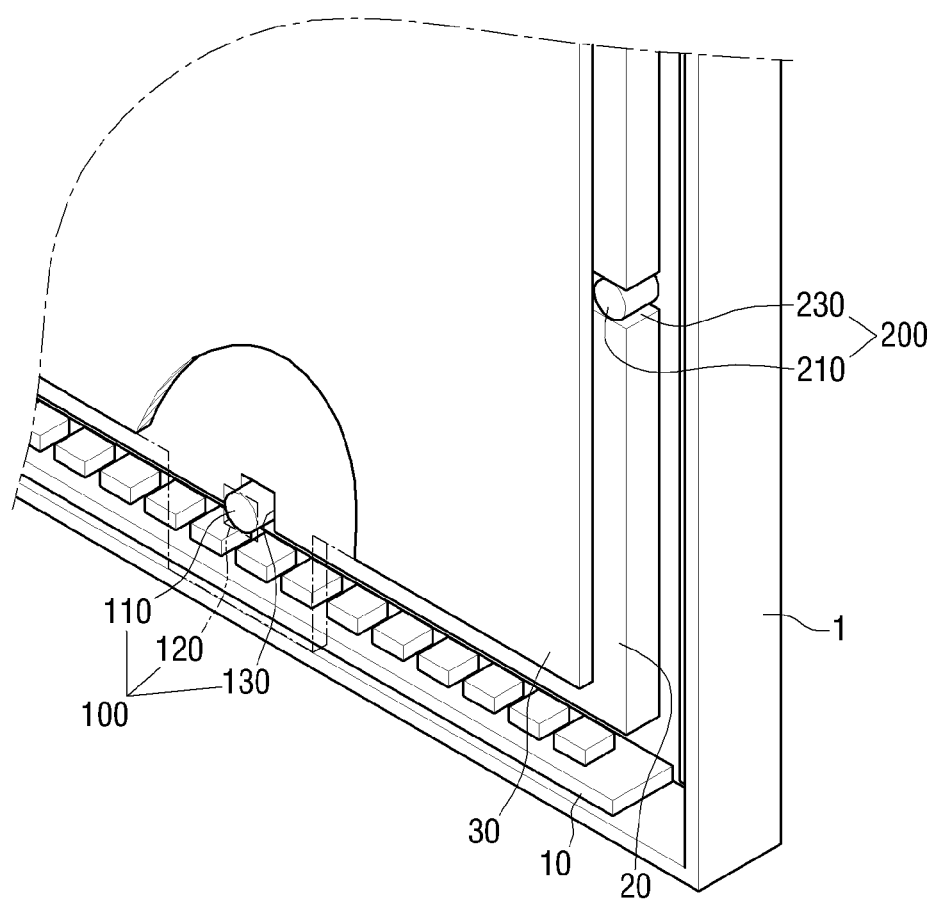
FIG. 5 is a view illustrating a BLU of a display apparatus according to a first exemplary embodiment.
Figure 6:
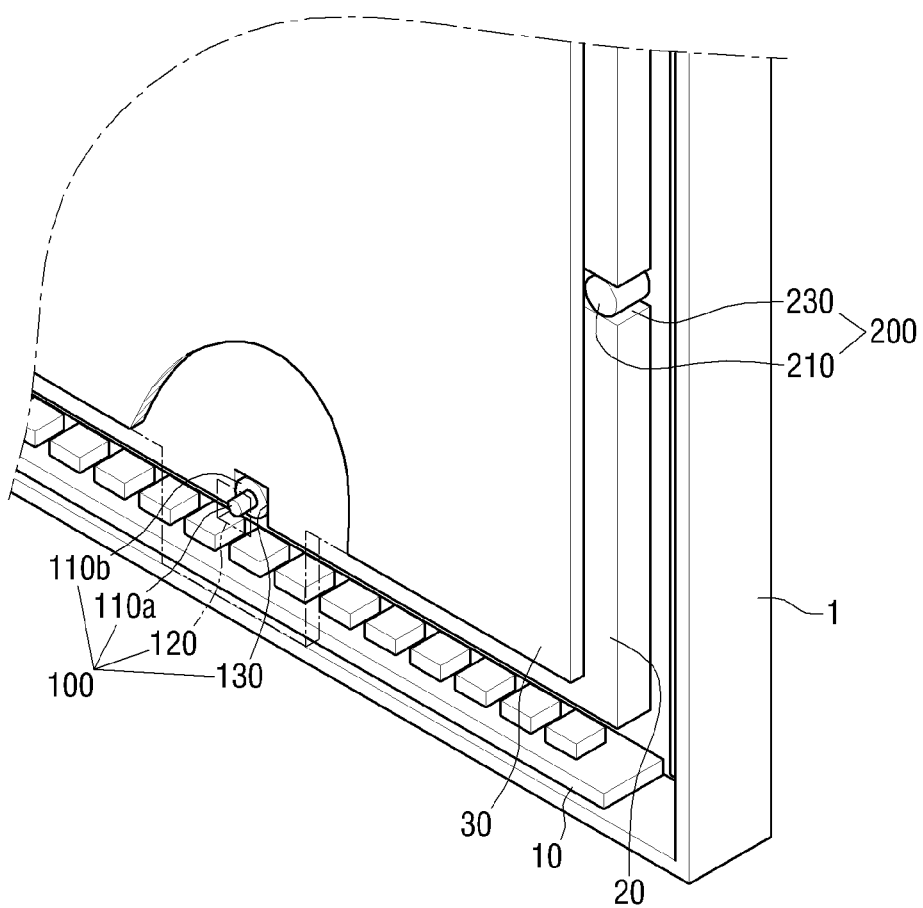
FIG. 6 is a view illustrating a BLU of a display apparatus according to a second exemplary embodiment.

The first fixing unit 100 fixes both the LGP 20 and the optical sheet 30. As shown in FIG. 5 and FIG. 6, the first fixing unit 100 includes a first fixing projection 110, an optical sheet opening 120 and a first support groove 130.

Figure 2:
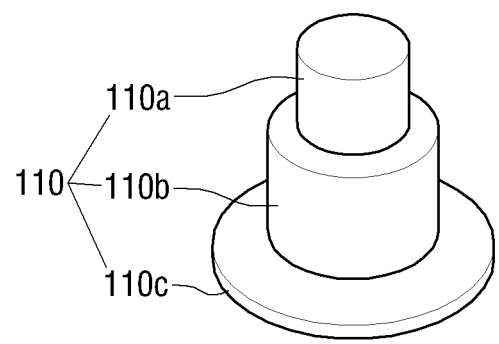
FIGS. 2 and 3 are perspective views illustrating a first fixing projection and a second fixing projection.

According to a first exemplary embodiment, as shown in FIG. 2, the first fixing projection 110 includes a first body 110a to support the optical sheet 30, a second body 110b to support the LGP 20, and a projection support plate 110c to fix the mounting location of the first fixing projection 110.

Figure 4:
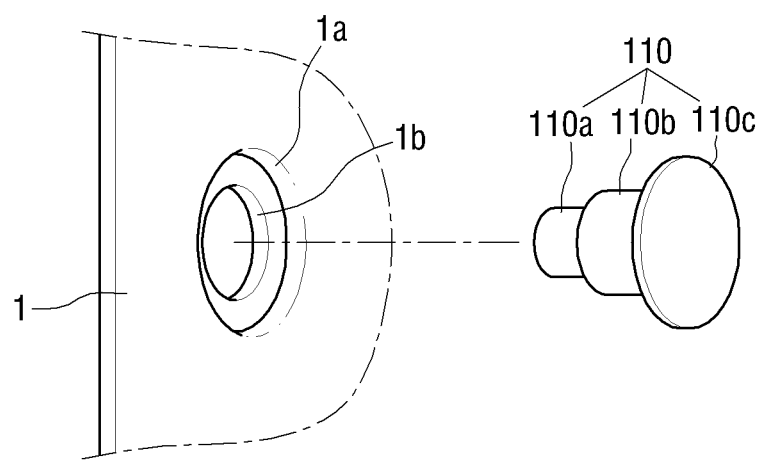
FIG. 4 is an exploded perspective view illustrating the first fixing projection of FIG. 2 assembled with a displaying housing.

As shown in FIG. 4, the first fixing projection 110 is penetratingly connected to a mounting recess 1a and a mounting hole 1b formed on a rear surface of the display housing 1. The mounting hole 1b may have a diameter corresponding to a diameter of the second body 110b. Accordingly, the first and the second bodies 110a and 110b passing through the mounting hole 1b support the optical sheet 30 and the LGP 20, respectively, and control locations of the optical sheet 30 and the LGP 20.

A diameter of the second body 110b of the first fixing projection 110 is sufficiently thick to support the weight of the LGP 20. In the case of a BLU using an edge-type LED light source, since the first fixing projection 110 is disposed proximate the light source 10, interference of light may be reduced as the diameter of the first fixing projection 110 becomes smaller. Accordingly, it is desirable to form the first fixing projection 110 with as small a diameter as possible. The first fixing projection 110 may be made of opaque materials and may be colored with black, in order to prevent a light leakage phenomenon. Additionally, at least two first fixing projections 110 may be mounted on an upper side and a lower side of the LGP 20, respectively, and may be disposed at four vertically symmetrical positions as shown in FIG. 1.

The optical sheet 30 may be made of resin film material and thus may be lighter than the LGP 20. Accordingly, a diameter of the first body 110a to be hooked into the optical sheet opening 120 may be smaller than the diameter of the second body 110b supporting the LGP 20 which is relatively heavier than the optical sheet 30.

The optical sheet opening 120 may be formed integrally with the optical sheet 30, and may be provided in the form of a penetrating hole having a predetermined size. The optical sheet opening 120 may have a size corresponding to the first fixing projection 110, as shown in FIG. 2.

Referring to FIG. 1, the first support groove 130 may be formed on the LGP 20 in the form of a trench having a width and a depth corresponding to the diameter of the first fixing projection 110, but there is no limitation thereto. Accordingly, the first support groove 130 may be formed have a width and a depth which are larger than the diameter of the first fixing portion 110 by a predetermined amount, taking into consideration thermal expansion of the LGP 20 occurring due to heat generated by the light source 10.

The first fixing projection 110, the optical sheet opening 120 and the first support groove 130 may function to fix the location of the LGP 20 and the optical sheet 30 while supporting the weight of the LGP 20 and the optical sheet 30. For example, four first fixing units 100 may be provided such that four first fixing projections 110, four optical sheet openings 120 and four first support grooves 130 are provided at four positions of the BLU, respectively. That is, as shown in FIG. 1, two of the first fixing units 100 are disposed symmetrically at two positions on the upper side of the LGP 20, and two of the first fixing units 100 are disposed symmetrically at two positions on the lower side of the LGP 20. However, the exemplary embodiments are not limited to four first fixing units 100 and other numbers of first fixing units may be utilized. Alternatively or additionally, although not shown, the first fixing units 100 may be provided at positions on a left side and a right side of the LGP 20.

Figure 3:
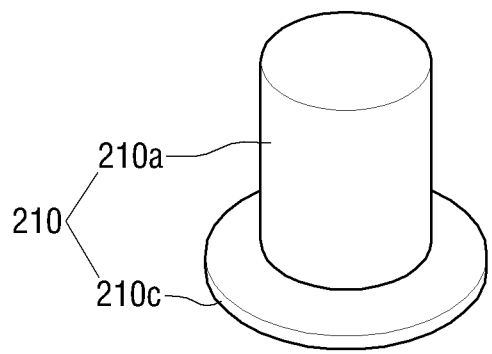

The second fixing unit 200 is similar to or the same as the first support groove 130 and the second body 110b of the first fixing unit 100. That is, as shown in FIG. 5, the second fixing unit 200 includes a second fixing projection 210 and a second support groove 230 and is similar to the first fixing unit 100 from which the first body 110a to support the optical sheet 30 is removed. Accordingly, the second fixing projection 210 shown in FIG. 3 is connected to the display housing 1 and supports the LGP 20. The second fixing projection 120 has a same diameter as the diameter of the second body 110b of the first fixing projection 110.

As shown in FIG. 1, six second fixing units 200 may be provided such that six second fixing projections 210 may be formed at six positions of the BLU, that is, a first position between the two first fixing projections 110 on the upper side of the LGP 20, a second position between the two first fixing projections 110 on the lower side of the LGP 20, a third position and fourth positions on a left side of the LGP 20, and a fifth position and sixth position on a right side of the LGP 20. However, the exemplary embodiments are not limited to six second fixing units 100 and the number of second fixing units 200 may increase according to a size of the LGP 20.

The second support groove 230 may be formed on the LGP 20 to have a width and a depth corresponding to the diameter of the second fixing projection 210. The second support groove 230 may be configured in the trench form which is the same as the first support groove 130 described above.

In this situation, the optical sheet opening 120 may have a size corresponding to the diameter of the first fixing projection 110 and second fixing projection 210. The optical sheet opening 120 is configured in the form of a quadrangle as shown in FIGS. 1, 5 and 6, but there is no limitation to such a quadrangle. Alternatively, the optical sheet opening 120 may be configured in the form of a circle, triangle or loop, although not shown in the drawings. In other words, any component part capable of having the shape of a penetrating hole in which the first fixing projection 110 is inserted may be used as the optical sheet opening 120.

Accordingly, the first fixing projection 110 and second fixing projection 210 may be used in common, and thus it is possible to more conveniently assemble the BLU and reduce the number of component parts of the BLU.

According to another exemplary embodiment, the first fixing projection 110 may include a first portion 110a for supporting the optical sheet 30, and a second portion 110b for supporting the LGP 20.

Since the optical sheet 30 is lighter in weight than the LGP 20, the first portion 110a which is inserted in the optical sheet opening 120 may be smaller in diameter than the second portion 110b for supporting the LGP 20 which is relatively heavier in weight than the optical sheet 30.

In this situation, the optical sheet opening 120 may be formed with a sufficient width or diameter to allow the first portion 110a to penetrate the optical sheet opening 120. However, even when the optical sheet opening 120 has a diameter corresponding to the second portion 110b as described above with reference to FIGS. 1 and 2, there is no problem to use the optical sheet opening 120.

Additionally, although not shown in the drawings, the first portion 110a may be provided in any form capable of supporting the optical sheet 30, for example a circle, triangle or loop.

As described above, the first fixing projection 110 can support both the LGP 20 and the optical sheet 30 at once, and therefore it is possible to reduce not only the cost required to manufacture the LGP 20 but also the number of component parts caused by component part commonality, as compared with related fixing methods.

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A backlight unit of a display apparatus, the backlight unit comprising:
    a display housing;
    a light source which is arranged along an inner circumference of the display housing;
    a light guide plate through which light of the light source is transmitted, and which forms surface light;
    an optical sheet which is disposed on an upper side of the light guide plate to upwardly diffuse the light of the light source transmitted through the light guide plate;
    a plurality of first fixing units, each of which fix locations of the light guide plate and the optical sheet;
    a plurality of second fixing units which support the light guide plate; and
    a support frame which is connected to the display housing to fix the optical sheet to the display housing provisionally, and has a window formed on a surface corresponding to the light guide plate to allow light to pass therethrough,
    wherein the light source, the light guide plate, the first fixing units, and the second fixing units are disposed between the display housing and the support frame,
    wherein the first fixing units comprise a first fixing projection which is a part separate from the display housing and the second fixing units comprise a second fixing projection which is a separate component part,
    wherein the first fixing projection comprises:
    a first portion which supports the optical sheet; and
    a second portion which supports the light guide plate,
    wherein a diameter of the first portion is smaller than a diameter of the second portion.

2. The backlight unit as claimed in claim 1, wherein each of the plurality of first fixing units comprises:
    the first fixing projection which is connected to a housing of the display apparatus;
    a first support groove which is formed in an outer side edge of the light guide plate at a position corresponding to the first fixing projection; and
    an optical sheet opening which is formed in the optical guide sheet at a position corresponding to the first support groove and through which the first fixing projection is inserted.

3. The backlight unit as claimed in claim 2, wherein the plurality of first fixing units are disposed symmetrically on an upper side and a lower side of the light guide plate.

4. The backlight unit as claimed in claim 2, wherein each of the plurality of second fixing units comprises:

the second fixing projection which is connected to the housing of the display apparatus; and a second support groove which is formed in the outer side edge of the light guide plate at a position corresponding to the second fixing projection.

5. The backlight unit as claimed in claim 4, wherein the plurality of second fixing units support an upper side, a lower side, a left side and a right side of the light guide plate.

6. The backlight unit as claimed in claim 5, wherein the plurality of second fixing units are disposed symmetrically at one position between the plurality of first fixing units at the upper side of the light guide plate and one position between the plurality of first fixing units at the lower side of the light guide plate, and disposed symmetrically at two positions at the left side of the light guide plate and two positions at the right side of the light guide plate.

7. The backlight unit as claimed in claim 4, wherein each of the first fixing projection and the second fixing projection is an opaque material.

8. The backlight unit as claimed in claim 1, wherein the first fixing projection and the second fixing projection are configured with the same shape.

9. The backlight unit as claimed in claim 1, wherein the first portion and the second portion have different diameters or widths.

10. The backlight unit as claimed in claim 1, wherein the light source comprises a plurality of light emitting diodes disposed at a periphery of the light guide plate.

11. The backlight unit as claimed in claim 1, wherein the second fixing units do not support the optical sheet.

12. The backlight unit as claimed in claim 1, wherein the plurality of first fixing units are disposed symmetrically on an upper side and a lower side of the light guide plate.

13. A backlight unit of a display apparatus, the backlight unit comprising:

a light source which emits light;

a light guide plate through which the light emitted by the light source is transmitted;

an optical sheet which diffuses the light emitted by the light source and transmitted through the light guide plate, wherein the light guide plate comprises at least one support groove which is formed in an outer portion of the light guide plate and through which a fixing projection is inserted to fix and support the light guide plate to a display housing, and the optical sheet comprises at least one opening which is formed in an outer portion of the optical sheet at a position corresponding to the at least one support groove and through which the fixing projection is inserted to fix and support the optical sheet, wherein the fixing projection is a part separate from the display housing and comprises a first portion which supports the optical sheet and a second portion which supports the light guide plate, wherein a diameter of the first portion is smaller than a diameter of the second portion.

14. The backlight unit as claimed in claim 13, the light guide plate comprises a plurality of support grooves which are formed in opposite side edges of the light guide plate and through which fixing projections are inserted to fix and support the light guide plate, and the optical sheet comprises a plurality of openings which are formed in outer side portions of the optical sheet and through which the fixing projections are inserted to fix and support the optical sheet.

15. The backlight unit as claimed in claim 13, the first portion and the second portion have different diameters or widths.

16. A backlight unit of a display apparatus, the backlight unit comprising:

a display housing;

a light source which is arranged along an inner circumference of the display housing;

a light guide plate through which light of the light source is transmitted, and which forms surface light;

an optical sheet which is disposed on an upper side of the light guide plate to upwardly diffuse the light of the light source transmitted through the light guide plate;

a plurality of first fixing units, each of which fix locations of the light guide plate and the optical sheet; and a support frame which is connected to the display housing to fix the optical sheet to the display housing provisionally, and has a window formed on a surface corresponding to the light guide plate to allow light to pass therethrough, wherein the light source, the light guide plate, and the first fixing units are disposed between the display housing and the support frame, wherein the first fixing units comprise a first fixing projection which is a part separate from the display housing, wherein the first fixing projection comprises:

a first portion which supports the optical sheet; and a second portion which supports the light guide plate, wherein a diameter of the first portion is smaller than a diameter of the second portion.

17. The backlight unit as claimed in claim 16, wherein the backlight unit further comprises a plurality of second fixing units which support the light guide plate.

18. The backlight unit as claimed in claim 17, wherein the second fixing units are disposed between the display housing and the support frame.

19. The backlight unit as claimed in claim 17, wherein the second fixing units do not support the optical sheet.

* * * * *